Jan. 24, 1956  J. STRINDLUND  2,732,080
FILTER HAVING WARPED CELL WALLS
Filed July 8, 1952  2 Sheets-Sheet 1

INVENTOR.
JOHN STRINDLUND
BY
Marechal Biebel French & Bugg
ATTORNEYS

Jan. 24, 1956  J. STRINDLUND  2,732,080
FILTER HAVING WARPED CELL WALLS
Filed July 8, 1952  2 Sheets-Sheet 2

*INVENTOR.*
JOHN STRINDLUND
BY
ATTORNEYS

United States Patent Office 2,732,080
Patented Jan. 24, 1956

2,732,080
FILTER HAVING WARPED CELL WALLS

John Strindlund, Upsala, Sweden, assignor to The Black-Clawson Company, Hamilton, Ohio, a corporation of Ohio Application July 8, 1952, Serial No. 297,746

4 Claims. (Cl. 210—199)

This invention relates to rotary suction filter drums and cylinders of the type including a cylindrical casing, a cylindrical strainer disposed in spaced relation to the outer surface of said casing, a circumferential row of longitudinally extending cells between said casing and said strainer, and outlets in said casing connecting said cells with the interior of said drum, said outlets extending over a minor portion of the length of said drum.

When operating filter drums of the kind described the rotational velocity of the drum is severely restricted by the fact that the cells will discharge comparatively slowly due to the slow rate at which the filtered medium, such as pulp, will flow towards the outlet openings.

The present invention has for its object to promote the discharging of the cells so as to enable an increased filter velocity and thus a larger filtering capacity of the filter drum.

For the object stated, the straining water in the cells is conducted to the outlets along guiding surfaces which are inclined forwardly as seen in the direction of rotation of the drum.

The present invention presents an advantage over known constructions in that the said inclined guiding surfaces for the straining water will be effective right from the bottom and as far as the top on the side of the drum which is being elevated from out of the pulp mixture, which is a feature of the invention. It is a pre-requisite for satisfactory operation of the novel construction according to the invention that the cells contain air also during the time during which they are immersed in the pulp mixture. To this end the cells will have to be made so large that they will not be completely filled with water. The air will then tend to accumulate in the portions remote from the outlet opening, and the water will, therefore, get a shorter way. This distribution will, as mentioned above, be initiated already when the cell is in its lowermost position in the pulp mixture.

Two specific embodiments of the invention will now be described in conjunction with the accompanying drawings in which.

Figure 1:
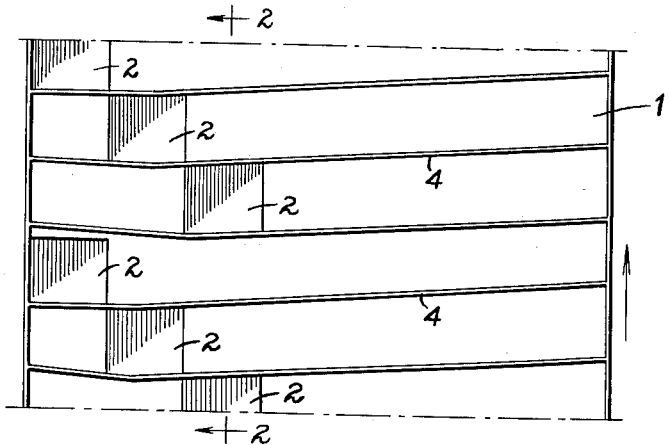
Fig. 1 is a side-view of a portion of the filter drum cylinder looking from left to right in Fig. 2, the strainer and the perforated covering plate, if such is included in the apparatus, being removed for simplicity of illustration.
Figure 2:
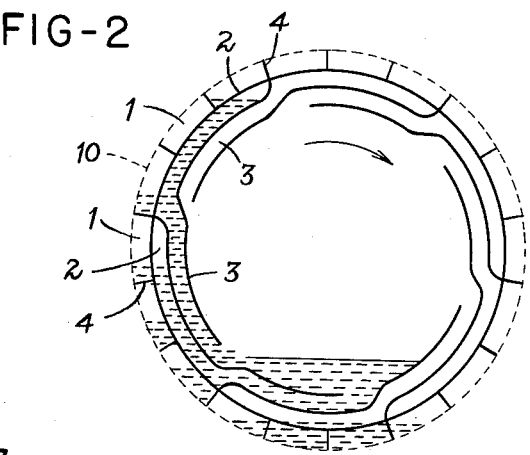
Fig. 2 is a cross-sectional view approximately on the line 2—2 of Fig. 1.
Figure 3:
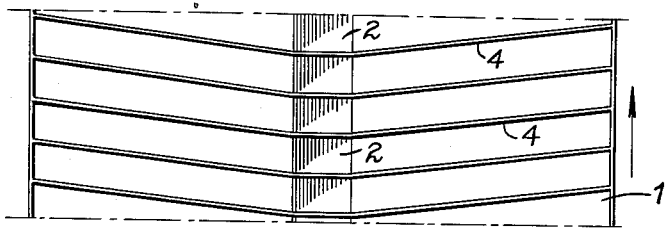
Figure 4:
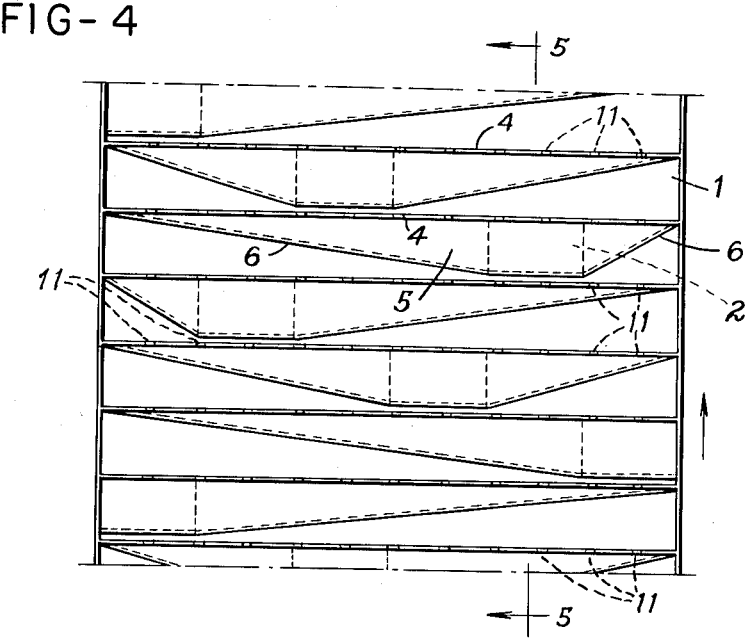
Figure 5:
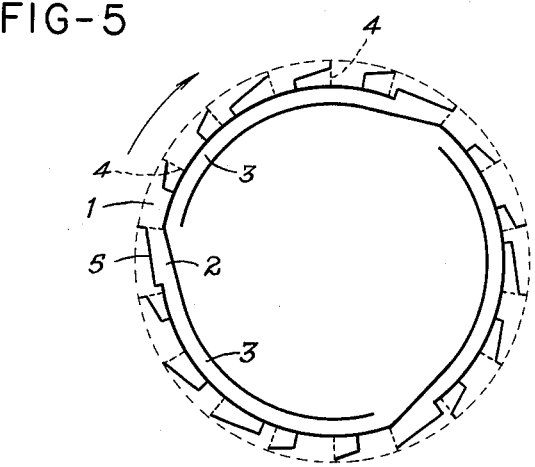

Fig. 3 is a view similar to that of Fig. 1 showing the drum with outlet openings of the cells in peripheral alignment; and Figs. 4 and 5 show a second embodiment of the inventive apparatus in a manner similar to that of Figs. 1 and 2, respectively, Fig. 5 being a cross-sectional view taken on the line 5—5 of Fig. 4.

Referring to Figs. 1 and 2, numeral 1 designates the cells situated beneath the cylindrical strainer 10 and having their outlet openings 2 distributed in three longitudinally offset circumferential rows. To the outlet openings 2 are connected rearwardly directed discharge ducts 3 which extend in spaced relation to the inside of the cylindrical wall of the drum to conduct the water from their associated cells to the interior of the drum during rising movement of the cells as illustrated in Fig. 2. According to the invention, the cells 1 are inclined relative to the generatrix of the drum in that the longitudinal side-walls 4 of each cell extend at a small angle forwardly in the direction of rotation of the drum from the outlet opening 2 of the cell, as shown in Fig. 1.

Referring now to Fig. 3, in the embodiment illustrated therein the outlet openings 2 of the cells are circumferentially aligned, and the discharge ducts leading from the same may be connected to any suitable suction means. With both these forms of the invention, as the side of the drum rises as indicated by the arrow in Figs. 1–3, the water entering each successive cell will immediately run down the inclined lower wall of the cell to its outlet opening 2, thus producing the desired rapid rate of drainage. At the same time, air can accumulate as stated in the ends of the wall without interfering with drainage through the outlet 2 and duct 3.

In the apparatus according to the invention it may be advantageous to construct the inclined cells in such a way that their depth increases towards the outlet.

In the embodiment shown in Figs. 4 and 5 the cells 1 have their side-walls running parallel with the generatrix of the drum, as usual, the inventive effect being in this case attained by means of pockets 5 of bucket shape in radial section which are built up in the cells and have their side-walls 6 extending at a small angle forwardly from the outlets 2 in the direction of rotation of the drum. The portion of the cell walls 4 which is common for cell and pocket is perforated or apertured as indicated at 11 so as to enable the straining water from a cell to flow through the wall into the pocket of the adjacent cell and along the declined walls of the latter to the outlet opening 2, with these walls 6 thus functioning in the same manner as the inclined cell walls 4 in the forms of the invention shown in Figs. 1–3.

It will be understood that the invention is not to be considered to be restricted to the embodiments described in the foregoing and illustrated in the accompanying drawings since various modifications will be obvious to anyone skilled in the art.

What I claim and desire to secure by Letters Patent is:

1. A rotary suction filter drum comprising a cylindrical casing, a cylindrical strainer disposed in spaced relation to the outer surface of said casing, generally radially arranged walls extending substantially parallel with the axis of said casing in the space between said casing and said strainer to form in said space a circumferential row of longitudinally extending cells, outlets in said casing connecting said cells with the interior of said drum, additional walls within said cells forming in each said cell a pocket of lesser volume than said cell, each said pocket opening toward the direction of rotation of said drum and connecting at the rearward side thereof with one of said outlets, said additional pocket walls being inclined forwardly from the outlet therein in the direction of rotation of said drum with respect to a line passing therethrough and parallel with the rotational axis of said drum to conduct liquid lengthwise of said drum to said outlet, and said cell walls having perforations therein for transmitting liquid from each said cell to the pocket in the next following said cell.

2. A rotary suction filter drum comprising a cylindrical drum casing, a cylindrical strainer disposed in outwardly concentric spaced relation to the outer surface of said casing, generally radially arranged walls disposed between said casing and said strainer to define a plurality of cells in the space between said cylinder and said casing, means forming a separate discharge outlet through said casing leading from each of said cells to the interior of said casing, each of said outlets extending over only a minor portion of the length of said casing, and each of said cells including a guiding surface for conducting to its associated said outlet lengthwise of said drum the liquid entering said cell through said strainer, said guiding surfaces being inclined forwardly from the associated said outlets in the direction of rotation of said drum with respect to a line passing therethrough and parallel with the rotational axis of said drum.

3. A rotary suction filter drum comprising a cylindrical drum casing, a cylindrical strainer disposed in outwardly concentric spaced relation to the outer surface of said casing, generally radially arranged walls disposed between said casing and said strainer to define a plurality of cells in the space between said cylinder and said casing, means forming a separate discharge outlet through said casing leading from each of said cells to the interior of said casing, each of said outlets extending over only a minor portion of the length of said casing, and said cell walls being inclined forwardly from the associated said outlets in the direction of rotation of said drum with respect to a line passing therethrough and parallel with the rotational axis of said drum to conduct to said outlets lengthwise of said drum the liquid entering said cells through said strainer.

4. A rotary suction filter drum comprising a cylindrical drum casing, a cylindrical strainer disposed in outwardly concentric spaced relation to the outer surface of said casing, generally radially arranged walls disposed between said casing and said strainer to define a plurality of cells in the space between said cylinder and said casing, additional walls forming in each of said cells a pocket of generally bucket-shape in radial section on said casing, said additional walls including side walls and a top wall cooperating to leave said pocket open only along the forward side thereof in the direction of rotation of said drum to receive liquid entering in the direction contrary to the rotation of said drum, means forming a separate discharge outlet through said casing leading from each of said pockets to the interior of said casing, each of said outlets extending over only a minor portion of the length of said casing, said side walls of said pockets being inclined forwardly in the direction of rotation of said drum from the associated said outlets with respect to a line passing therethrough and parallel with the rotational axis of said drum to conduct to said outlets lengthwise of said drum the liquid entering said cell through said strainer, and said cell walls having perforations therethrough to transmit said liquid from each said cell to the next adjacent said pocket in the direction contrary to the rotation of said drum.

References Cited in the file of this patent

UNITED STATES PATENTS

| 1,816,132 | Strindlund | July 28, 1931 |
| 1,840,101 | Jespersen | Jan. 5, 1932 |
| 2,537,414 | Lindblad | Jan. 9, 1951 |

FOREIGN PATENTS

| 96,036 | Sweden | June 20, 1939 |
| 510,034 | Great Britain | July 26, 1939 |